United States Patent [19]

Foster

[11] 4,202,528
[45] May 13, 1980

[54] COUPLER AND JACK ASSEMBLY
[75] Inventor: Alan D. Foster, Adrian, Mich.
[73] Assignee: Dayton-Walther Corporation, Dayton, Ohio
[21] Appl. No.: 888,231
[22] Filed: Mar. 20, 1978
[51] Int. Cl.² .............................................. B60S 9/02
[52] U.S. Cl. ................................................. 254/86 R
[58] Field of Search ......................... 254/45, 86 R, 98; 280/763

[56] References Cited
U.S. PATENT DOCUMENTS

| | | | |
|---|---|---|---|
| 2,348,869 | 5/1944 | Wagner | 254/86 R |
| 3,592,443 | 7/1971 | Budrow | 254/86 R |

Primary Examiner—Robert C. Watson
Attorney, Agent, or Firm—Biebel, French & Nauman

[57] ABSTRACT

A mobile home jack and coupler assembly is adapted for mounting to the A-frame or tongue of a mobile home. Both top mounted coupler assembly and inverted bottom mounted coupler assembly are disclosed. Each includes a screw jack which mounts from underneath. The screw jack carries, adjacent its lower end, a mounting plate which is received in underlying relation to a portion of the coupler, while the upper end thereof extends through a guide plate above the coupler. The mounting plate on the jack is welded to the jack body by an underlying weld, with the result that the tongue weight of the mobile home is carried directly by the jack support plate in compression, rather than in tension, and the compressive force is transferred by the underlying weld, also in compression, to the jack body. As a result, jack mounting screws do not carry the tongue weight applied to the jack, and greater tongue loads can more safely be carried.

1 Claim, 4 Drawing Figures

COUPLER AND JACK ASSEMBLY

BACKGROUND OF THE INVENTION

This invention relates to coupler and jack assemblies for mobile homes and the like. Commonly, such couplers are attached at the A-frame portion of the mobile home with the jack being inserted through the top of the assembly and retained by bolts in such a manner that the vertical tongue load was imposed on the mounting bolts in tension. While this was a satisfactory arrangement and permitted the jack to be assembled from the top and easily retained, nevertheless it lacked certain load carrying said safety features due to the fact that the load was carried on the mounting bolts and the coupler assembly was limited in the tongue loads which could be supported.

SUMMARY OF THE INVENTION

The present invention is directed to an improved mobile home coupler assembly including a jack, in which the jack has welded thereon a support plate which is received in underlying relation to the lower support member of the hitch or coupler assembly. The weld between the support plate and the body of the jack is also in underlying relation to the support plate, so that the tongue weight of the mobile home is transferred directly to the jack support plate in compression and to the jack body through the attaching weldment in compression.

The invention may be applied to coupler and jack assemblies of both the top mount and the inverted types. In the former, the ball-receiving hitch or coupler and its supporting plate are mounted on the upper surface of the converging beams defining the tongue A-frame. In the latter, an inverted type of ball hitch or coupler is supported on the lower surface of the A-frame. In each instance, a jack support or guide plate is mounted and welded on the side which is opposite the coupler plate and defines a jack-receiving opening which is in vertical alignment with an opening formed in the plate portion of the coupler.

It is accordingly an important object of this invention to provide a coupler and jack assembly for a mobile home in which the tongue weight is transmitted to a jack only by loads which are applied in compression.

Another object of the invention is the provision of improved low-cost coupler assemblies, as outlined above, having superior load carrying and safety features.

DESCRIPTION OF PREFERRED EMBODIMENTS

Figure 1:
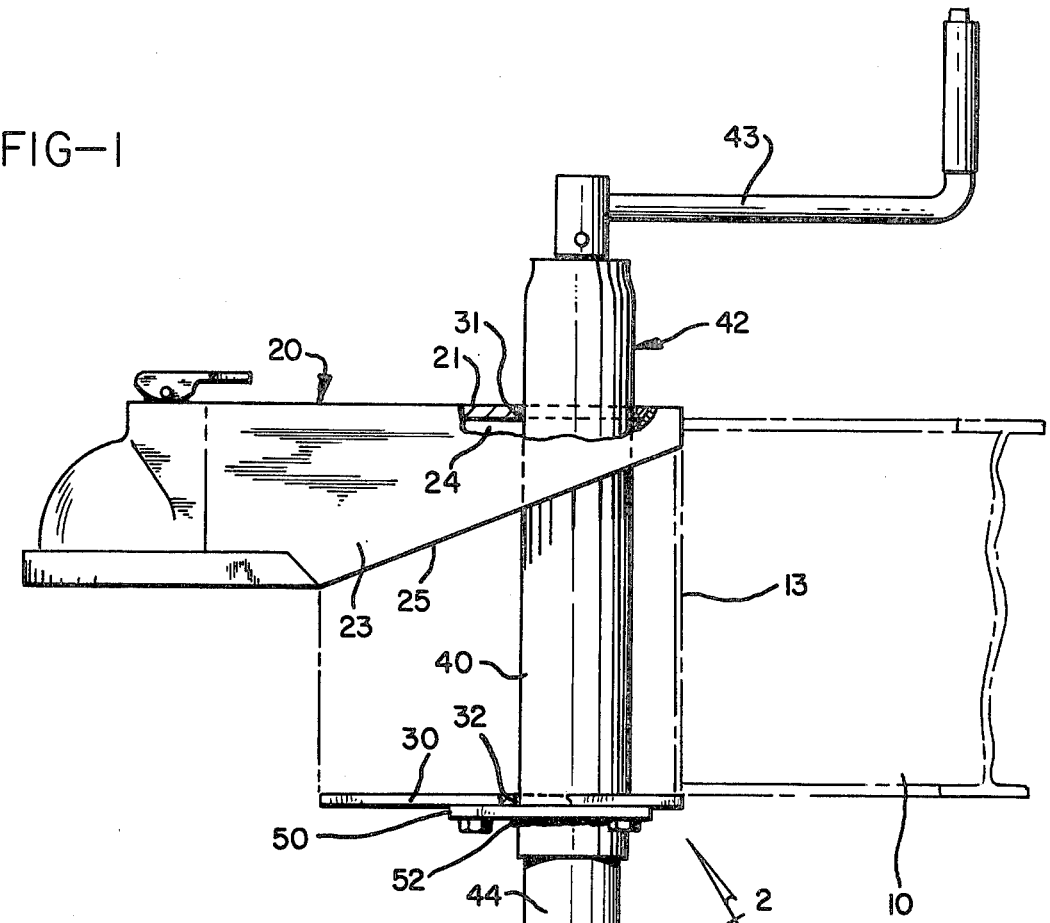
FIG. 1 is a side elevation of a top mount type of coupler and jack assembly according to this invention.
Figure 2:
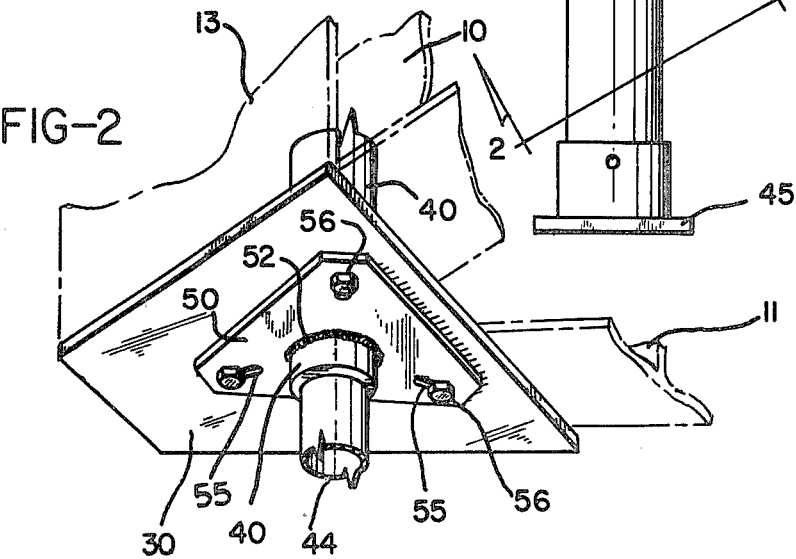
FIG. 2 is a bottom perspective view of the assembly looking generally along the line 2—2 of FIG. 1.

Referring to FIGS. 1 and 2, the typical A-frame or tongue portion of the mobile home is shown in broken outline form, and commonly consist of a pair of converging I-beams 10 and 11 as seen in phantom in FIG. 2. Commonly, side plates 13 are welded at the forwardmost sides of the converging beams for added strength, and to provide weld surfaces for the coupler.

FIGS. 1 and 2 illustrate a typical top mounted coupler and jack assembly according to this invention. A ball-receiving hitch or coupler 20 is formed with a generally triangular upper plate portion 21 received in overlying relation to the upper side or surfaces of the converging beam members. The coupler 20 is formed with downwardly depending side webs 23 and 24 which are positioned outwardly of the side plates 13. Therefore, the top or upper plate portion 21 of the coupler 20 rests on the upper webs of the converging beams forming the A-frame tongue of the mobile home, while the depending sides 23 and 24 conform closely to the sides of the strengthening plates 13. The coupler 20 will commonly be welded in place along the inclined edges 25 of the side plates 23 and 24.

A generally triangularly shaped jack guide plate 30 is mounted on a side of the beams 10 and 11 opposite to that of the coupler member 20 and is similarly welded in place along its margins. Means in the upper plate portion 21 and the lower guide plate 30 define axially aligned, jack-receiving openings including an opening 31 formed in the plate portion 21 and an opening 32 formed in the guide plate 30. These openings receive the elongated tubular body 40 of the screw-type jack 42. The body 40, when assembled, extends from a point below the lower plate 30 to a point above the upper plate portion 21 and includes an offset crank handle 43, by means of which the lower telescoped end 44 of the jack may be raised or lowered. A conventional shoe of platform 45 is carried on the lower end 44 for contact with the ground. If desired, a caster wheel may be used in place of the platform 45.

The jack 42 includes a triangular jack support plate 50 which is telescoped on the tubular jack body 40 adjacent the lower end thereof. The jack support plate 50 defines a bottom mounting plate for the jack, and is secured directly to the tubular jack body 40 by means of an underlying annular weld 52, as shown in FIG. 2. The weld 52 may be considered as comprising connector means underlying the plate 50 and supporting the plate 50 on the jack body 40, which connector means carries the tongue load in compression. The three corners of the plate 50 may be provided with slotted openings 55 to receive self-tapping screws 56 which extend through the openings 55 and into the adjacent plate 30 for retaining the jack 42 in the assembled position.

It will be seen that the tongue weight is transmitted to the jack 42 by a downward force applied directly to the jack support plate 50 by the jack guide plate 30, in compression, and without placing any tension on the mounting screws 56. This tongue weight is thus transferred to the tubular body 40 of the jack through the underlying annular connector means or weld 52, with this transfer of weight also in compression as regards the weld. The threaded screws 56 are not relied upon to carry the tongue weight of the mobile home when the jack is in use, but need only support the weight of the jack 42. Thus, the safety of the coupler and jack assembly does not depend upon the mounting screws 56 and greater loads can be supported than have previously been permissible.

Figure 3:
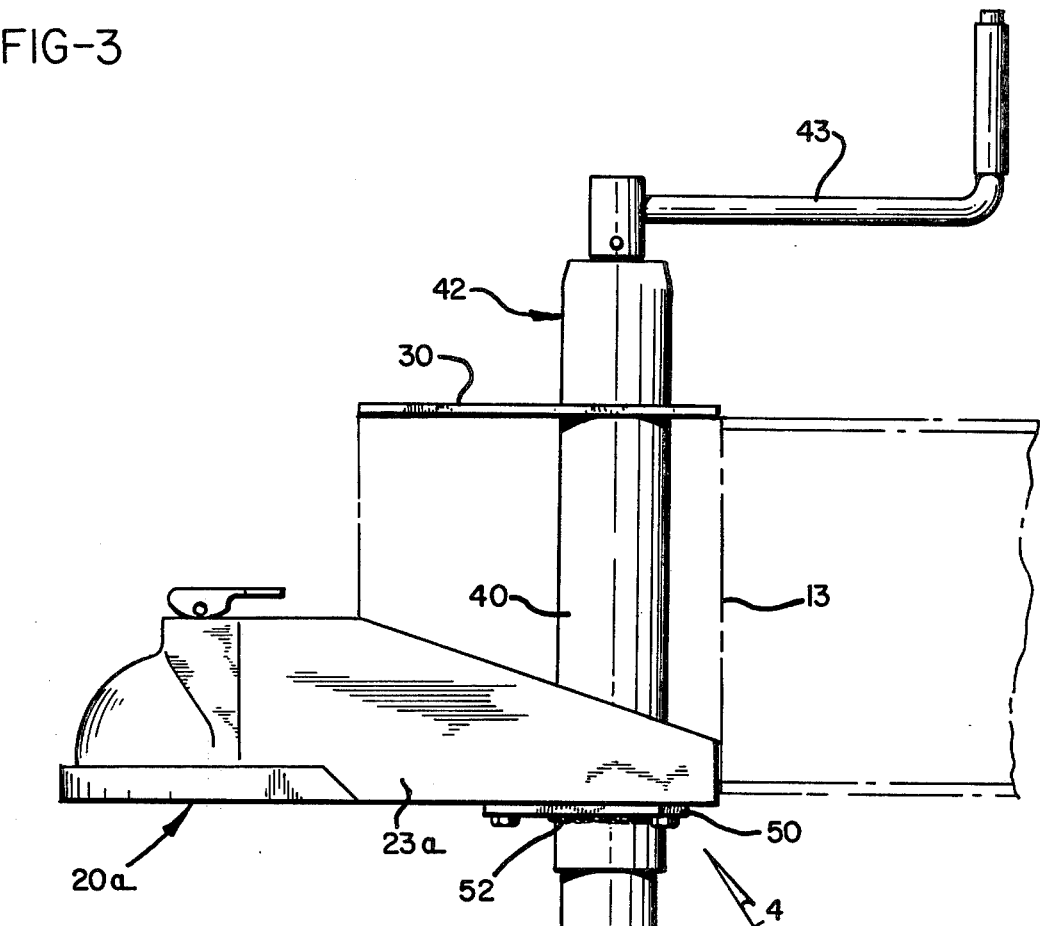
FIG. 3 is an elevational view of an inverted coupler and jack assembly according to this invention.
Figure 4:
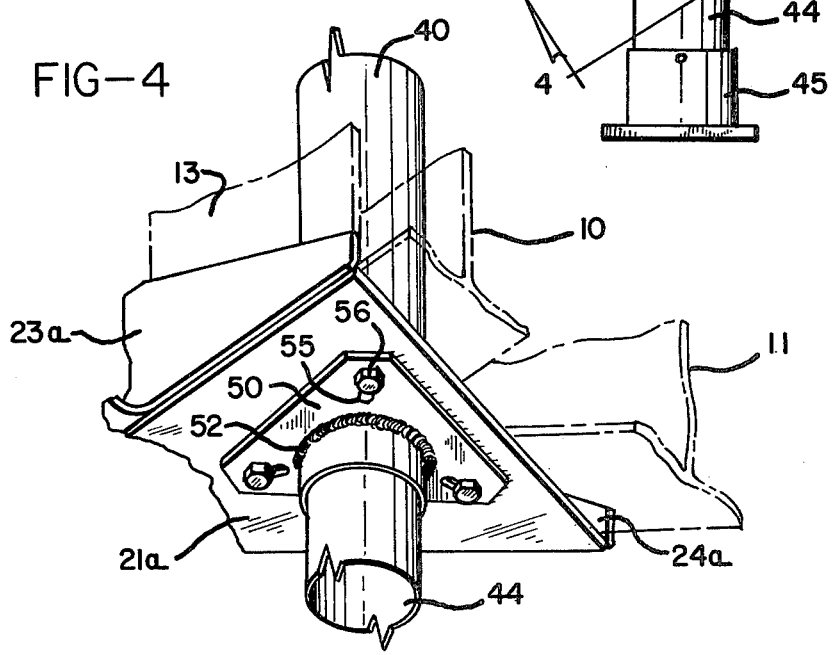
FIG. 4 is a perspective view of the bottom thereof looking generally along the lines 4—4 of FIG. 3.

The embodiment of FIGS. 3 and 4 illustrates the invention as applied to an inverted coupler assembly in which like parts are provided with like reference numerals. The same jack 42 is employed as with the embodiments of FIGS. 1 and 2. An inverted coupler 20a in this instance is mounted at the bottom of the forward end of the A-frame with its upwardly-extending side members 23a and 24a positioned adjacent the side surfaces of the plates 13, and welded in place. An underlying plate portion 21a of the coupler defines a jack-receiving opening which is in vertical alignment with the corresponding opening 32 formed in the jack guide plate 30. However, the jack guide plate 30 in this embodiment now overlies the top surface of the converging I-beams of the mobile home. Again, the tongue weight in this embodiment is transferred by the plate portion 21a of the coupler 20a directly to the jack support plate 50 and through the annular weld 52 to the tubular jack body 40, in compression. The upper end of the jack 42 is guided at the plate 30.

While the forms of apparatus herein, described constitute preferred embodiments of this invention, it is to be understood that the invention is not limited to these precise forms of apparatus, and that changes may be made therein without departing from the scope of the invention.

I claim:

1. A jack assembly for use with a moble home or the like for connection to the tongue portion of the home, in which the tongue portion is provided with vertically spaced upper and lower plate members each having a jack-receiving opening therein, comprising: a screw type jack having a tubular body, a jack support plate telescoped on said body adjacent a lower end thereof, an underlying annular weld securing said support plate to an outer surface of said body, said body having an upper portion adapted to be received through the openings in said tongue portion with an upper end thereof extending above the upper plate member, and free of any load supporting connection with said upper plate member and with said jack support plate positioned in immediate underlying relation to the adjacent lower surface of the lower plate member, and means for securing said jack support plate to the lower plate member for retaining said jack in place, whereby the entire tongue weight of the mobile home is transferred directly to said jack support plate in compression and to said tubular jack body through said annular weld, in compression.

* * * * *